United States Patent [19]

Hashimoto et al.

[11] Patent Number: 4,909,566

[45] Date of Patent: Mar. 20, 1990

[54] CONSTRUCTION OF COWL BOX OF VEHICLE

[75] Inventors: Teruo Hashimoto; Isao Hirashima; Katsumi Sakane; Tadashi Ioka, all of Hiroshima, Japan

[73] Assignee: Mazda Motor Corporation, Hiroshima, Japan

[21] Appl. No.: 274,813

[22] Filed: Nov. 23, 1988

[30] Foreign Application Priority Data

Nov. 30, 1987 [JP] Japan .................................. 62-304365
Dec. 11, 1987 [JP] Japan .................................. 62-314889

[51] Int. Cl.⁴ ............................................. B62D 25/08
[52] U.S. Cl. ..................................... 296/192; 296/194; 296/70; 98/2.16
[58] Field of Search .................... 296/192, 194, 70; 98/2.16, 2.17; 165/41–43; 180/90

[56] References Cited

U.S. PATENT DOCUMENTS

| | | | |
|---|---|---|---|
| 3,788,681 | 1/1974 | Barenyi | 296/192 |
| 4,332,187 | 6/1982 | Imai | 296/192 |
| 4,400,011 | 8/1983 | Matsuno | 296/194 |
| 4,718,712 | 1/1988 | Nakatani | 296/192 |
| 4,750,780 | 7/1988 | Harasaki | 296/192 |

FOREIGN PATENT DOCUMENTS 60-160262 10/1985 Japan .

Primary Examiner—Robert R. Song
Attorney, Agent, or Firm—Wenderoth, Lind & Ponack

[57] ABSTRACT

A cowl box of a vehicle in which a duct passagae through which an air duct of an air conditioner extends in a vertical direction is arranged to support a front windshield in such a fashion that the cowl box and the air duct are superposed as viewed in a transverse direction of a car body. According to this feature, the cowl box can be disposed in an instrument panel without narrowing the width of the cowl box and without enlarging the instrument panel.

15 Claims, 5 Drawing Sheets

CONSTRUCTION OF COWL BOX OF VEHICLE

BACKGROUND OF THE INVENTION

1. Field Of The Invention

This invention relates to a cowl box of a vehicle.

2. Description Of The Prior Art

In a vehicle, such as an automobile, it is conventional that a cowl box extending in a transverse direction of the car body is provided above a dash panel which partitions an engine compartment at the front of a car body from a passenger compartment and that a lower rim of a front windshield is adhered to the cowl box. For example, Japanese Utility Model Registration Application Laid-Open Publication No. 60-160262 discloses a defroster duct provided between a cowl box and an instrument panel, with its nozzle at the upper surface of the instrument panel, so as to defrost a front windshield fixed to the cowl box.

In accordance with the recent trend of improving aerodynamic characteristics of a vehicle, the rearward inclination of front windshields is made larger by locating a cowl box point (a point intersection of a front windshield with a hood) lower in the front of the car body, a result of which being that the cowl box is also located lower.

In a head-on collision, it sometimes happens that when the front part of a vehicle is crushed, an engine exhibiting high rigidity is forced back toward the passenger compartment relatively uncrushed. In such a case, if a cowl box is located relatively low, its lower part hits against the engine which is moving back and is then crushed. However, if the impact of the colliding vehicles is large, the cowl box moves back, as it is crushed, together with the engine and a force is generated in a direction that tends to separate the cowl box and the front windshield.

If the cowl box has a broader width in a lengthwise direction of a car body, when it collides with the engine the amount of crushing (crushability) of its lower part is larger; in other words, it absorbs the impact and accordingly the force acting in a direction tending to separate the front windshield from the cowl box is reduced. In this case, however, the cowl box having a broader width necessarily has its rear part extending to the underside of an upper wall of the instrument panel and therefore it becomes necessary to increase the width (in the lengthwise direction of a car body) of the instrument panel so as to secure a required space for accommodating a defroster duct. This naturally requires a corresponding reduction in space for occupants, namely, the passenger compartment is narrowed.

The broader the width of the cowl box, the more a nozzle of the defroster duct at the upper wall of the instrument panel is shifted rearwardly of the car body and therefore, air cannot be blown upwardly from near the lower rim of the front windshield and it becomes difficult to defrost the lower part of the front windshield. This tendency is especially noticeable when the cowl box is located lower in the front of the car body and a rearward inclination of the front window glass is large. On the other hand, if the defroster duct has a bend so as to extend from the rear part toward the upper part of the cowl box, its nozzle can be open near the front edge of the cowl box but it becomes necessary to secure a space for accommodating the defroster duct above the cowl box. Therefore, the level of the upper wall of the instrument panel is correspondingly raised and the space for occupants is reduced.

SUMMARY OF THE INVENTION

It is an object of the present invention to prevent the separation of a front windshield from a cowl box due to a collision involving the vehicle by broadening the width of the cowl box without broadening the width of the instrument panel (without increasing the amount that the instrument panel projects toward the passenger compartment) and without raising the level of the instrument panel, thereby avoiding the need for increasing the size of the instrument panel and improving the comfortableness of the vehicle.

In order to attain the above object, a cowl box is provided which extends in a transverse direction of the car body with its upper wall and lower wall arranged at the inside of the instrument panel and which defines a duct passage to allow an air duct of an air conditioner to pass in a vertical direction through the upper part of the upper wall and the lower part of the lower wall, and wherein the cowl box and the air duct are superposed when viewed in the transverse direction of the car body.

In the above cowl box, at least a part of the space for accommodating an air duct is defined within the width of the cowl box by the duct passage. More particularly, even if the width of the cowl box is broadened for preventing the separation of the front windshield during a collision, the air duct can extend in a vertical direction without making a circuit around the cowl box and accordingly, a relatively large width of the instrument panel is unnecessary. Also, since the air duct can extend in the vertical direction without making a circuit around the cowl box, in an embodiment in which a nozzle is open at the upper wall of the instrument panel, such an opening can be located very near the front side of the instrument panel and therefore, it is not necessary to raise the level of the instrument panel.

It is another object of the present invention to provide a useful means which constitutes a duct passage. More particularly, this means comprises openings defined by the upper wall and the lower wall of the cowl box.

According to this means, the air duct is defined within the width of the cowl box. This makes it easy to attain the first object stated above.

It is another object of the present invention to improve the support of the front windshield by the cowl box at the time of collision, while ensuring the sealing of the cowl box under a normal condition.

In order to attain the above object in the cowl box which extends in a transverse direction of the car body, an opening is provided in each cowl panel respectively forming an upper wall of the cowl box and a dash upper panel constituting a lower wall of the cowl box inside the instrument panel. An air duct through which the air of an air conditioner passes in a vertical direction through these openings is arranged in the cowl box and a circumferential edge part defining the opening of the dash upper panel is connected to a circumferential edge part defining the opening of the cowl panel in such a fashion that when a load forced to the rear of the car body acts on the dash upper panel, the circumferential edge part of the dash upper panel can be moved from the circumferential edge part of the cowl panel.

In the above cowl box, at the time of collision, the dash upper panel is crushed as it is moved toward the rear of the car body and therefore even if the circumferential edge part defining the opening of the dash upper panel is moved rearwardly as it is crushed, the cowl panel can be prevented from being dragged by the dash upper panel at the circumferential edge part thereof. Generally, when an opening is provided in the cowl panel and in the dash upper panel, both panels are joined at the circumferential edge parts defining the openings and the cowl box is sealed. This alone would normally tend to cause a problem in that when the dash upper panel is being crushed as it is moving rearwardly, the cowl panel is dragged by the dash upper panel and is moved rearwardly. However, due to the structure of the invention mentioned above, rearward movement of the cowl panel, namely, rearward displacement of the cowl box as a whole can be prevented.

Other objects of the present invention are to reinforce the cowl panel and the dash upper panel while preventing the cowl box from being dragged rearwardly during a collision, to reduce noises tending to be transmitted to the passenger compartment and to improve the ease in the assembling of the air duct to the cowl box.

In order to attain the above objects, an annular reinforcement which projects downwardly from the circumferential edge part defining one opening is provided at the cowl panel and another annular reinforcement which projects upwardly from the circumferential edge part defining another opening is provided at the dash upper panel, whereby the cowl panel and the dash upper panel are connected to each other through both reinforcements which serve as an air passage.

The circumferential edge parts defining the openings of the cowl panel and the dash upper panel are reinforced by the reinforcements. Also, since the air passage is formed between the panels by the reinforcements, the air duct is not required to be thrust through the openings of the panels. Thus, the ease in assembly is improved. Furthermore, the reinforcements can prevent the transmission of noises from inside the cowl box to the passenger compartment.

It is another object of the present invention to prevent the whole upper wall of the cowl box from being dragged toward the rear of the car body by the lower wall of the cowl box during a collision.

In order to attain the above object, the opening in the upper wall of the cowl box serving as the duct passage has the shape of slot which is elongate in a transverse direction of the car body. Due to this feature, at the time of collision, even if the rear end part of the upper wall is pulled rearwardly by the lower wall, the upper wall deforms in such a fashion that the diameter of the opening in the lengthwise direction of the car body is enlarged and thus the upper wall as a whole is prevented from moving rearwardly and the separation of the upper wall from the front windshield can be prevented.

It is another object of the present invention to interpose sealing material between the circumferential edge part defining the opening of the cowl panel and the circumferential edge part defining the opening of the dash upper panel, both being connected movably in relation to each other, for ensuring a seal at the joined parts.

It is another object of the present invention to establish a seal around the openings of the upper wall and the lower wall of the cowl box. For this purpose, sealing material is interposed between the circumferential edge parts defining the openings of the upper wall and the lower wall and the air duct so as to reduce the transmission of noises and the passage of dust from inside of the cowl box to the passenger compartment.

It is another object of the present invention to provide even a better seal around both openings. For this purpose, a rubber boot is provided around the air duct between the opening of the upper wall and the opening of the lower wall of the cowl box and an air layer is formed between the air duct and the rubber boot. At the upper end portion of the rubber boot, a seal is established between the air duct and the circumferential edge part defining the opening of the upper wall of the cowl box and a seal is also established at the lower end part of the rubber boot between the air duct and the circumferential edge part defining the opening of the lower wall of the cowl box. In this case, the air layer facilitates sound insulation.

Another useful way in which to form the duct passage is by denting a part of the rear edge parts of the upper wall and the lower wall of the cowl box frontwardly of the car body. By forming the duct passage in this way, it is not necessary to form openings in the cowl box and to thus consider sealing such openings.

It is another object of the present invention to supplement the rigidity of the cowl box in the embodiment above. For this purpose, a reinforcement extending in a transverse direction of the care body is provided at the rear side of the air duct and both ends of the reinforcement are connected to the cowl box at both sides of the duct passage. In this embodiment, the cowl box exhibits improved torsional rigidity and flexural rigidity.

It is another object of the present invention to more effectively prevent the separation of the front windshield from the cowl box at the time of collision. For this purpose, bent parts are formed at the upper wall so that the length of the upper wall from its front end at which the front windshield is supported to a joint at which the upper wall is connected to the lower wall of the cowl box is longer than the straight line distance from the front end of the upper wall to the joint. In this embodiment, at the time of collision, even if the rear end portion of the upper wall is pulled rearwardly of the car body by the lower wall, until the bent part is made straight, front end part of the upper wall supporting the windshield does not move rearwardly and thus the separation of the front windshield from the cowl box can be prevented. In this case, the upper wall of the cowl box includes an upper shoulder part which supports, at its front end part, the front windshield of the vehicle, a vertical part which extends downwardly from the rear end of the upper end portion of the upper shoulder part and a lower shoulder part which extends rearwardly from a lower end of the vertical part, with its rear end connected with the lower wall of the cowl box. Further, two bent parts establish the boundary between the upper shoulder part and the vertical part and the boundary between the vertical part and the lower shoulder part.

It is another object of the present invention to more accurately prevent the separation of the front windshield from the cowl box at the time of collision. For this purpose, the cowl box is provided with an upper wall which supports the front windshield of the vehicle, a lower wall with its rear end portion connected to a rear end portion of the upper wall and a front wall which extends upwardly from a forward end of the lower wall. A forward end of the upper wall and an upper end of the front wall are separated in a lengthwise direction of the car body so that both are not directly connected to each other mechanically. With this structure, at the time of collision, even if the front wall moves rearwardly of the car body, the upper wall does not move and thus the separation of the front windshield form the upper wall can be prevented.

When the upper wall and the front wall are separated from each other as stated above, the duct passage may be defined by openings in the upper wall and the lower wall. Furthermore, the provision of bent parts at the upper wall as stated above can more accurately prevent the separation of the front windshield from the upper wall.

BRIEF DESCRIPTION OF THE DRAWINGS

The accompanying drawings show preferred embodiments of the present invention, in which.

DETAILED DESCRIPTION OF THE PREFERRED EMBODIMENTS

The preferred embodiments of the present invention are described below with reference to the accompanying drawings.

EMBODIMENT 1

This embodiment is shown in FIG. 1–FIG. 4.

Figure 1:
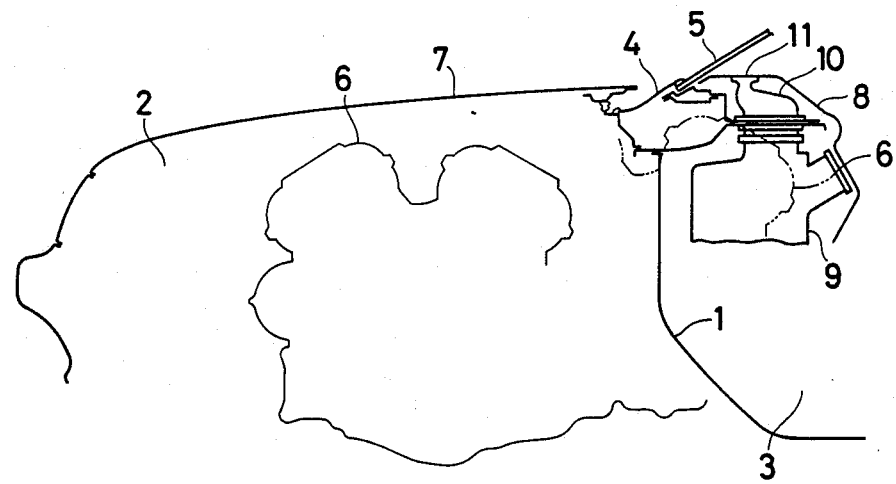
FIG. 1 is a cross section of embodiment 1 of a cowl box according to the present invention.

In FIG. 1, reference numeral 1 designates a dash lower panel which partitions an engine compartment 2 from a passenger compartment 3 of the vehicle. A cowl box 4 which extends in a transverse direction of the car body is provided above the dash lower panel 1. A front windshield 5 is fixed to the cowl box 4. An engine 6 is provided in the engine compartment 2 and is covered at its upper part with a hood 7. The cowl box 4 is located inside an instrument panel 8. A defroster duct 10 of an air conditioner 9 passes through the rear part of the cowl box 4 in a vertical direction. A nozzle 11 of the defroster duct 10 is open at the upper surface of the instrument panel 8.

Figure 2:
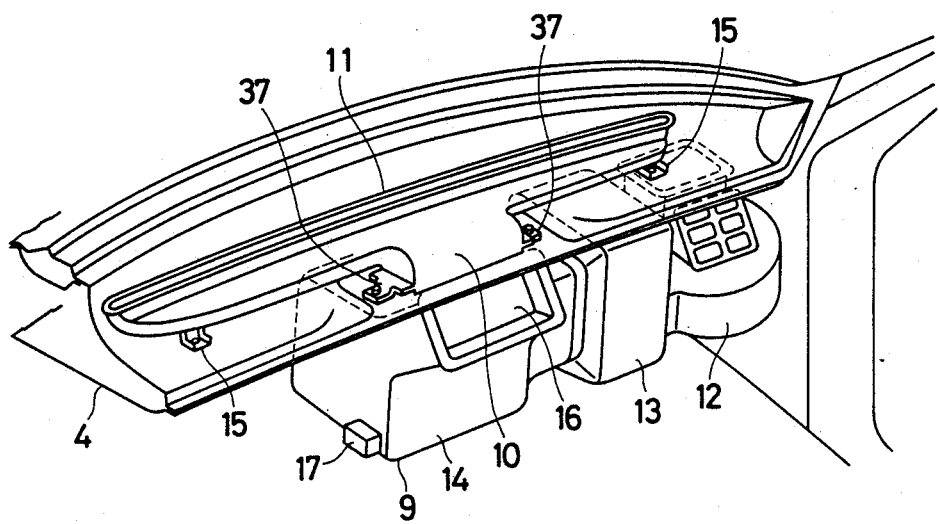
FIG. 2 is a perspective view of embodiment 1 of the cowl box.

As shown in FIG. 2, the air conditioner 9 comprises a blower unit 12, a cooler unit 13 and a heater unit 14 connected in series. The defroster duct 10 is connected at its lower end to the heater unit 14 which is at the center, in a transverse direction, of the car body. The defroster nozzle 11 has an opening in the shape of a slot extending in a transverse direction of the car body, and is supported on the cowl box 4 by support members 15. In FIG. 2, reference numeral 16 designates a ventilator and reference numeral 17 designates a floor heater.

Figure 3:
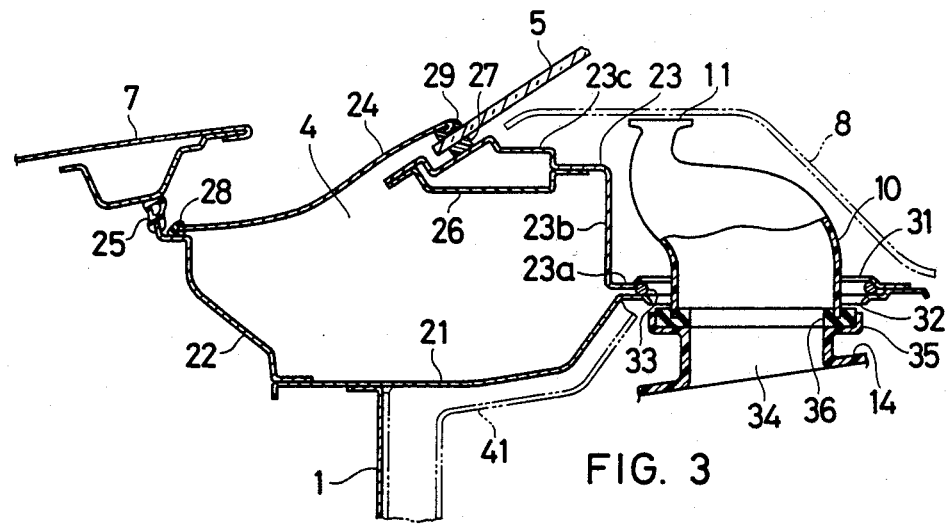
FIG. 3 is a cross section of the cowl box shown in FIG. 2.
Figure 4:
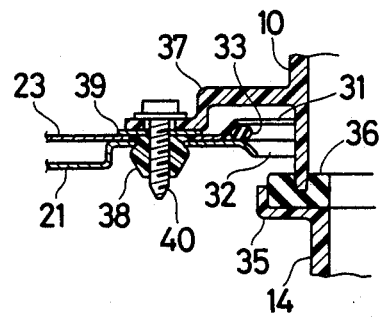
FIG. 4 is a cross section of the connection between the cowl box and a defroster duct.

The structure of the cowl box 4 is shown in more detail in FIG. 3 and FIG. 4.

The cowl box 4 has a closed cross-sectional shape, extends in a transverse direction of the car body and comprises a dash upper panel 21, a cowl front panel 22, a cowl rear panel 23 and a cowl grille panel 24. In this embodiment, the dash upper panel 21 includes a lateral plate which is connected to an upper end of the dash lower panel 1 and extends in a lengthwise direction of the car body. The cowl front panel 22 is connected to and extends upwardly from a front edge of the dash upper panel 21. A weather strip 25 which acts as a seal against water between the hood and the cowl box is provided at an upper edge of the cowl front panel 22. The cowl rear panel 23 is connected at its rear edge to a rear edge of the dash upper panel 21 and comprises a lower shoulder part 23a, a vertical wall 23b and an upper shoulder part 23c. The upper shoulder part 23c, together with a reinforcement 26 connected to the undersurface thereof, form a closed cross-sectional structure extending in a transverse direction of the car body. The front windshield 5 is fixed with an adhesive 27 to an upper surface of the upper shoulder part 23c. The cowl grille panel 24 extends in a lengthwise direction of the car body and its front edge is connected to an upper edge of the cowl front panel 22 and its rear edge is connected to a lower edge of the front windshield with sealing material 28 and sealing material 29, respectively. In this embodiment, the boundary between the lower shoulder part 23a and the vertical wall 23b and the boundary between the vertical wall 23b and the upper shoulder part 23c are defined by bent portions, respectively. Due to these two bent portions, the length of the cowl rear panel 23 from a location at which panel 23 supports the front windshield to the rear edge part connected to the dash upper panel 21 is longer than the straight line distance between said location and the rear edge part. The upper edge of the cowl front panel 22 and the front edge of the cowl rear panel 23 are separated from each other and are not connected mechanically by the cowl grille panel 24.

The lower shoulder part 23a of the cowl rear panel 23 constitutes a rear upper wall of the cowl box 4 and the rear part of the dash upper panel 21 constitutes a rear lower wall of the cowl box 4. The upper wall and the lower wall at the rear of the cowl box are located inside the instrument panel 8, namely, below an upper wall part of the instrument panel 8. An opening 31 having a large diameter and an opening 32 having a small diameter, through which the defroster duct 10 passes in a vertical direction, are defined at the lower shoulder part 23a of the cowl rear panel 23 and at the rear of the dash upper panel 21. Thus, the defroster duct 10 extends in a vertical direction (but can be inclined in a lengthwise direction or in a transverse direction) between the upper part of the rear upper wall and the lower part of the rear lower wall of the cowl box 4 through the openings 31, 32 and is superposed with the cowl box when viewed in the transverse direction of the car body.

A circumferential edge part of the dash upper panel 21 defining opening 32 is connected, movably toward the rear of the car body, to a circumferential edge part of the cowl rear panel 23 defining opening 31 through sealing material 33. In this embodiment, the circumferential edge parts of the cowl rear panel 23 and the dash upper panel 21 are opposed to each other with a slight distance therebetween and sealing material is interposed between the two circumferential edge parts.

The lower end of the defroster duct 10 adheres to sealing material 36 supported on a flange 35 of a defroster jet 34 and thus a seal is established between the defroster duct 10 and the heater unit 14. As shown in FIG. 2 and FIG. 4, the defroster duct 10 includes, at its lower part, support pieces 37 projecting to both sides thereof. These support pieces 37 are opposed to a plastic grommet 38 fixed to the dash upper panel 21 and are connected to a screw 40 through a packing 39.

In FIG. 3, reference numeral 41 designates an insulator stretched over the dash lower panel 1 and the dash upper panel 21.

In the above embodiment, when a head-on collision occurs, the front part of the vehicle body is crushed but the engine 6 exhibiting a high degree of rigidity is not crushed but is forced rearwardly to the position shown by a chain line in FIG. 1, whereby the dash lower panel 1 and the lower part of the cowl box 4 and the air conditioner 9 (made of plastics) exhibiting a low degree of rigidity are deformed or crushed.

However, since the cowl box 4 has a width of such an extent that its rear part projects deep in the instrument panel 8, the amount of crushing of the cowl box 4 by the engine 6 is large; in other words, the cowl box 4 absorbs a portion of the impact caused by the collision by being crushed and after it can no longer be crushed, its upper part is deformed due to its being dragged by its lower part. However, even if the engine 6 is forced rearwardly to a large extent, a large amount of crushing (large crushability) of the cowl box allows such rearward movement and it is possible to check the large force tending to act on the cowl rear panel 23. In this case, the opening 32 of the dash upper panel 21 is also crushed rearwardly but at this time the circumferential edge part defining the opening 32 gradually separates from the circumferential edge part defining the opening 31 of the cowl rear panel 23 as it is moved rearwardly but does not drag the cowl rear panel 23 strongly to the rear.

In this embodiment, the dash upper panel 21 and the cowl rear panel 23 are connected indirectly to each other by a threaded grommet 38 and a screw 40 but since the threaded grommet 38 is made of plastics and its adhesiveness to the dash upper panel 21 or the screw 40 in an axial direction is weak, when force acting in a direction tending to separate the front windshield from the cowl box acts between the dash upper panel 21 and the cowl rear panel 23, the screw grommet 38 comes off the dash upper panel 21 and therefore there is only a slight probability that the rearward movement of the dash upper panel 21 is transmitted to the cowl rear panel 23. Thus, a large amount of such force does not act on the cowl rear panel 23; in other words, only a slight amount of such force acting in the direction tending to unfasten the cowl box 4 and the front windshield 5 is actually transmitted and thus, separation of the front windshield 5 from the cowl box 4 in a head-on collision can be prevented.

Since the cowl rear panel 23 is provided with the vertical wall 23b and is bent in this embodiment, even if the engine 6 is forced still further rearwardly after the dash upper panel 21 is crushed by the engine 6, such movement of the engine is allowed due to the bent parts being stretched and the vertical wall 23b being laid down. Thus, the separation of the front windshield 5 can be prevented.

As stated above, the cowl box 4 has a large width as taken in a lengthwise direction of the car body but since the defroster duct 10 passes, in a vertical direction, through the openings 31, 32 in the cowl box 4 without forming a circuit extending around the rear of the cowl box 4, the width of the instrument panel 8 in a lengthwise direction of the car body need not be made larger in correspondence with the broadening of the width of the cowl box 4 in a lengthwise direction of the car body.

That the defroster duct 10 can extend through the openings in a vertical direction means that the defroster nozzle 11 can be open at the front part of the instrument panel 8, without bending the defroster duct 10 frontward above the cowl box 4. Therefore, it is not necessary to raise the level of the upper wall part of the instrument panel 8 and it is possible to blow the air for defrosting upwardly from near the lower rim portion of the front windshield 5 and thus, condensation and frost on the front windshield can be removed entirely. This means that in the vehicle with a cowl point (a point of intersection of a front windshield and a hood) located deep within the car body and a large rearward inclination of the front window glass, it is possible to lower the level of the instrument panel 8 in correspondence with the lowering of the cowl point, without reducing the defrosting function.

Since the circumferential edge parts of panels 23, 21 defining openings 31,32 are connected by support pieces 37 of the defroster duct 10 (refer to FIG. 2 and FIG. 4), a reduction in rigidity due to bending and torsion at the perforations 31, 32 rarely takes place and there is no possibility of the sealing material 33 coming off or being broken due to deformation of the circumferential edge parts defining openings 31, 32. In this embodiment, the fitting of the defroster duct 10 within the cowl box 4 by means of support pieces 37 ensures close contact between a lower end of the defroster duct 10 and sealing material 36 of the heater unit 14.

EMBODIMENT 2

In this embodiment, elements which are substantially the same as those in Embodiment 1 are given the same reference numerals. This also applies to the other embodiments described below.

Figure 5:
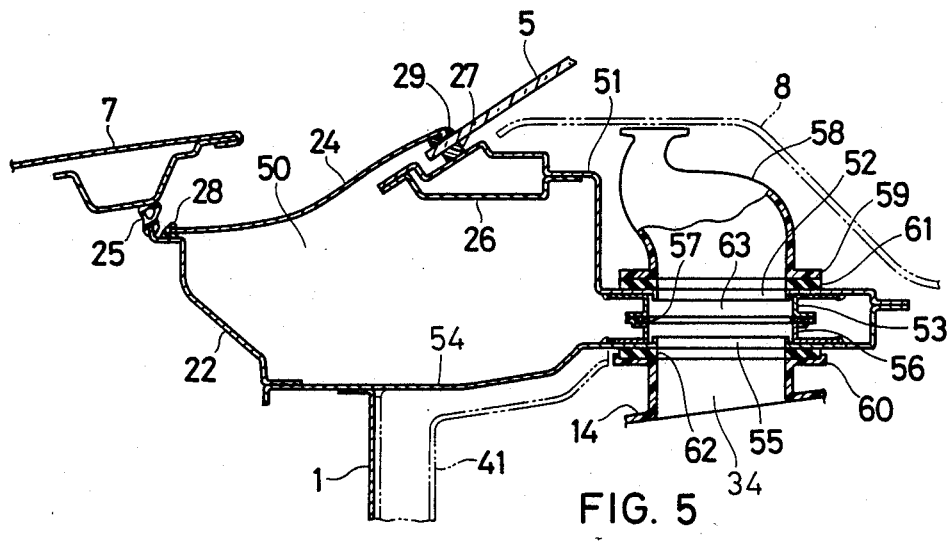
FIG. 5 is a cross section of embodiment 2 of a cowl box according to the present invention.

This embodiment is shown in FIG. 5.

In a cowl box 50 in this embodiment, a cowl rear panel 51 is provided with an annular reinforcement 53 projecting downwardly at a circumferential edge part defining an opening 52 and a dash upper panel 54 is provided with an annular reinforcement 56 projecting upwardly at a circumferential edge part defining an opening 55. Sealing material 57 is interposed between reinforcements 53, 56. More particularly, each of the reinforcements 53, 56 has a tubular shape with its axis extending in a vertical direction and has a flange for connecting and a flange for sealing at the ends thereof, respectively. The flanges for connecting are connected to the cowl rear panel 51 and the dash upper panel 54, respectively. The sealing material 57 is interposed between the opposed flanges for sealing. A defroster duct 58 has, at its lower end, a flange 59 which is connected to the upper surface of a circumferential edge part defining the opening 52 of the cowl rear panel through sealing material 61. The heater unit 14 is connected, at a flange 60 of the defroster jet 34, to the underface of the circumferential edge part defining the opening 55 of the dash upper panel 54 through sealing material 62. The remaining structure of this embodiment is similar to that of Embodiment 1.

In this embodiment, the cowl box 50 is reinforced at the circumferential edge part of the panels defining openings 52, 55 by means of the reinforcements 53, 56 and is thus resistant to bending and torsion. Also, both reinforcements 53, 56, along with the sealing material 57, act as an air passage for the defroster, and the defroster duct 58 and the defroster jet of the heater unit 14 are not required to pass through either of the two openings 52, 55. Thus, the assembling of the structure is comparatively easy. Moreover, the passenger compartment can be insulated from the noise outside the vehicle and from engine noises which are transmitted in the cowl box 50 by means of the reinforcements 53, 56, the defroster duct 58 and the heater unit 14.

EMBODIMENT 3

Figure 6:
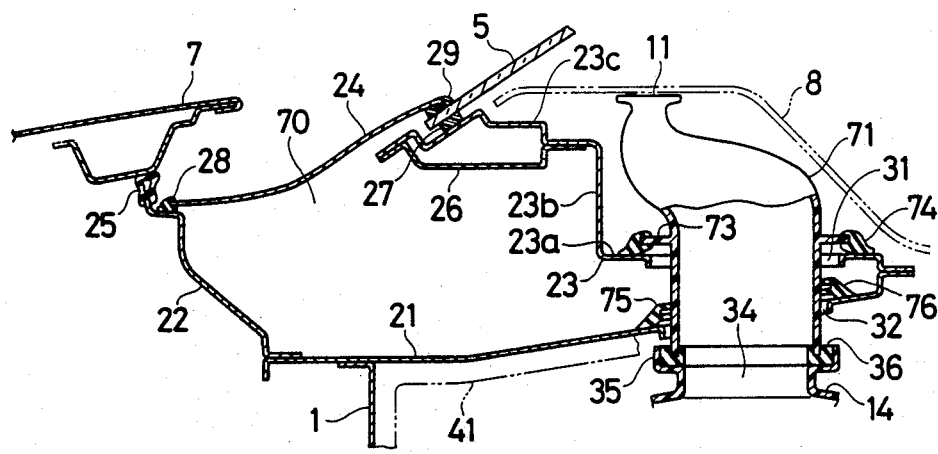
FIG. 6 is a cross section of embodiment 3 of a cowl box according to the present invention.

This embodiment is shown in FIG. 6.

In a cowl box 70 in this embodiment, a sealing member 74 fixed to a flange 73 at the upper part of the defroster duct 71 is connected to the circumferential edge part of the cowl rear panel 23 defining opening 31 and a sealing member 76 fixed to a lower flange 75 is connected to the circumferential edge part of the dash upper panel 21 defining opening 32 for establishing a seal around openings 31, 32.

In this embodiment, when the defroster duct 71 is passed through a duct passage of the cowl box 70 from above, sealing members 74, 75 of the upper and lower flanges 73, 75 make close contact with the circumferential edge parts defining the openings 31, 32 to establish a perfect seal around the openings 31, 32. Also, the lower end of the defroster duct 71 makes close contact with the sealing material 36 of the heater unit 14 to establish a perfect seal between the two. Thus, sealing at each part can be done automatically and at the same time when the defroster duct 71 is fitted in the cowl box.

EMBODIMENT 4

Figure 7:
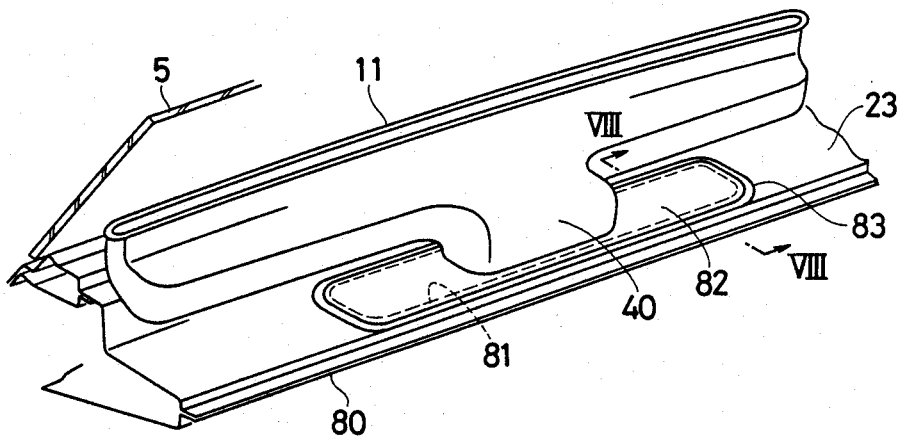
FIG. 7 is a perspective view of embodiment 4 of a cowl box according to the present invention.
Figure 8:
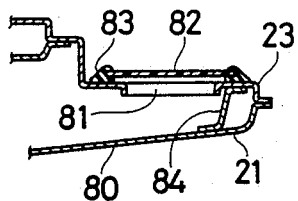
FIG. 8 is a cross-sectional view taken along line VIII—VIII in FIG. 7.

This embodiment is shown in FIG. 7 and FIG. 8.

A cowl box 80 in this embodiment has a duct passage of the same type as in Embodiment 3. An opening 81 of the cowl rear panel 23 is a slot extending in a transverse direction of the car body. Therefore, a flange 82 at the upper part of the defroster 40 is also elongate in a transverse direction of the car body to correspond to the opening 81. A sealing member 83 is fixed to the circumferential edge part of the flange 82. A reinforcement 84 is provided between the dash upper panel 21 and the cowl rear panel 23 of the cowl box 80 in such a fashion that it extends over the two at the rear of the opening 81. The reinforcement 84, the dash upper panel 21 and the cowl rear panel 23 define a closed cross-sectional structure having a length substantially corresponding to the dimension of the opening 81 as taken in a transverse direction of the car body. As to the details of the remaining structure, this embodiment is similar to Embodiment 1.

In this embodiment, when a head-on collision occurs, even if the engine is forced rearwardly and the lower wall of the cowl box 80 (namely, dash upper panel 21) is crushed entirely so that the engine 6 can move further rearwardly, the circumferential edge part defining slot 81 is deformed in such a fashion that it enlarges the diameter of slot 81 in a lengthwise direction of the car body. Thus, the upper wall of the cowl box 80 (namely the cowl rear panel 23) is prevented from being dragged rearwardly in its entirety and the separation of the front window glass 5 is also prevented.

EMBODIMENT 5

Figure 9:
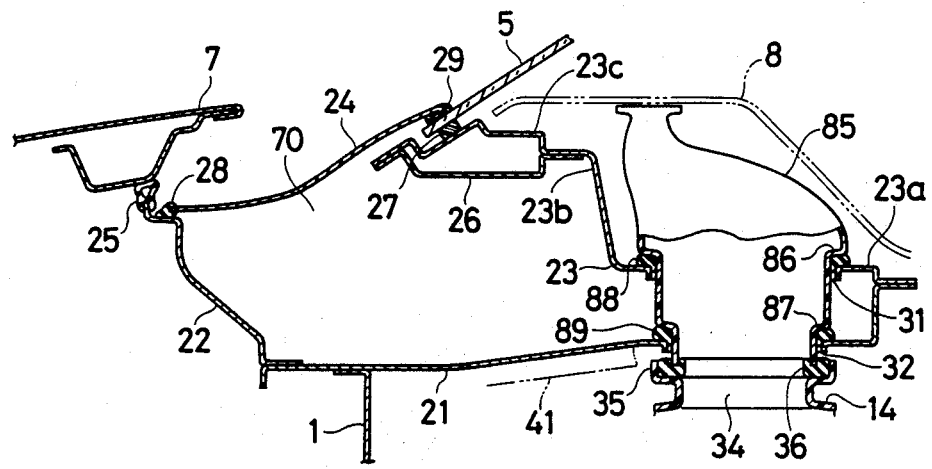
FIG. 9 is a cross section of embodiment 5 of a cowl box according to the present invention.

This embodiment is shown in FIG. 9.

The cowl box 70 has openings 31, 32 as in Embodiment 3. A defroster duct 85 has shoulder parts 86, 87 to oppose the circumferential edge parts defining the openings 31, 32. Sealing material 88, 89 is respectively interposed between the circumferential edge parts defining the openings 31, 32 and the shoulder parts 86, 87. This sealing material 88, 89 is respectively pre-fixed to the shoulder parts 86, 87.

In this embodiment, similar to Embodiment 3, when the defroster duct 85 is mounted to the cowl box from above, sealing of each part can be done automatically at the same time. Thus, structure of the defroster duct 85 and the sealing structure are relatively simple. Sealing material 88, 89 may be fixed to the cowl box 70 before the mounting of the duct 85 thereto.

As to the details of the remaining structure, this embodiment is similar to Embodiment 1.

EMBODIMENT 6

Figure 10:
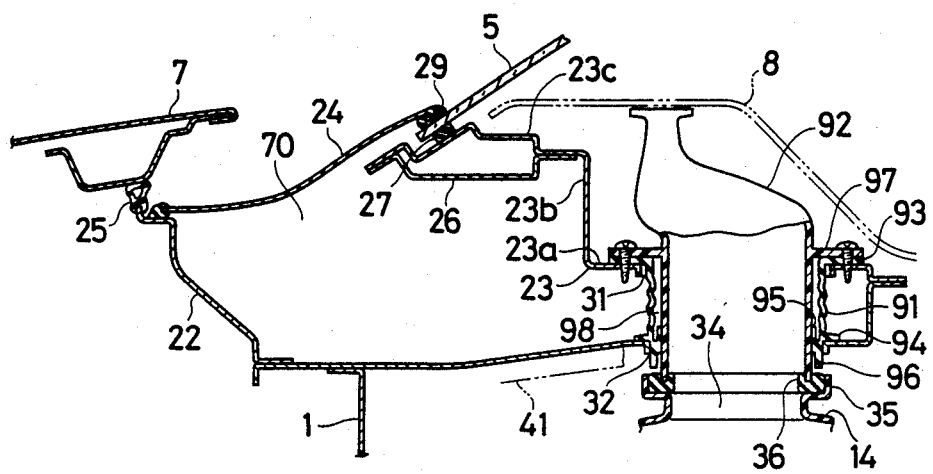
FIG. 10 is a cross section of embodiment 6 of a cowl box according to the present invention.

This embodiment is shown in FIG. 10. The cowl box 70 in this embodiment is characterized by the sealing structure.

The cowl box 70 has openings 31 as in Embodiment 3. A rubber boot 91 is fitted to the cowl box within openings 31, 32 and a defroster duct 92 extends through the rubber boot 91.

More specifically, the rubber boot 91 has at its upper end an upper sealing part 93 projecting outward in a flange-like manner and at its lower end a lower sealing part 94 projecting outward in flange-like manner, a lip 95 projecting inward and a knob 96 projecting downward. The defroster duct 92 has a flange 97 projecting outward above the opening 31. The rubber boot 91 itself is inserted in the cowl box 70 through the upper opening 31. The upper sealing part 93 makes contact with the upper surface of the cowl rear panel 23 and is fixed, together with the flange 97 of the defroster duct 92, to the cowl rear panel 23 by a screw and seals the upper opening 31. On the other hand, the lower sealing part 94 makes contact with the upper surface of the dash upper panel 21 and seals the lower opening 32. The lip 95 makes contact with the other peripheral surface of the defroster duct 92 and forms a closed air layer 98 between the rubber boot 91 and the defroster duct 92.

In assembling these parts, the upper sealing part 93 of the rubber boot 91 is mounted to the upper surface of the cowl rear panel 23, the defroster duct 92 is passed through the rubber boot 91 and then the knob 96 is pulled downward, whereby the lower sealing part 94 makes close contact with the dash upper panel 21.

In this embodiment, the means for sealing the openings 31, 32 is simple and this means, together with provision of the knob 96, contributes to a reduction in the number of parts and an improvement in ease of assembly. By the formation of the air layer 98, sound insulation at the openings 31, 32 can be improved.

As to the details of the remaining structure, this embodiment is similar to Embodiment 1.

EMBODIMENT 7

Figure 11:
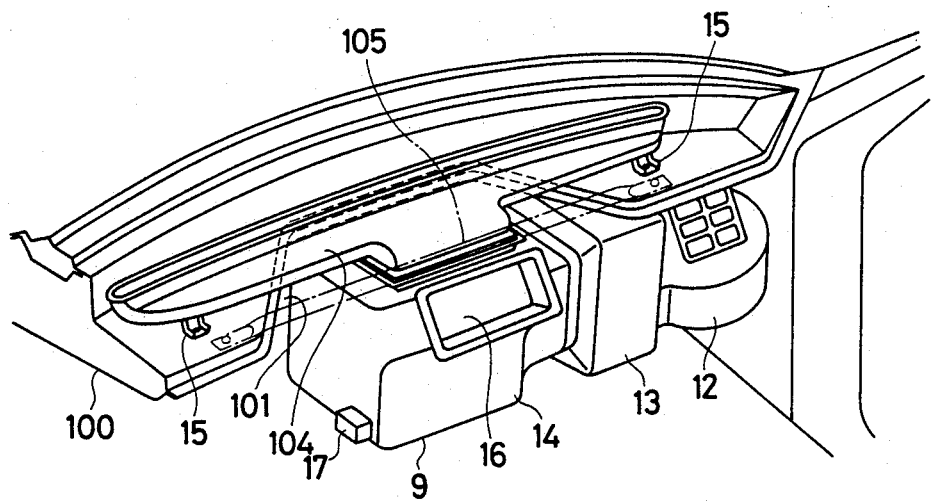
FIG. 11 is a perspective view of embodiment 7 of a cowl box according to the present invention.
Figure 12:
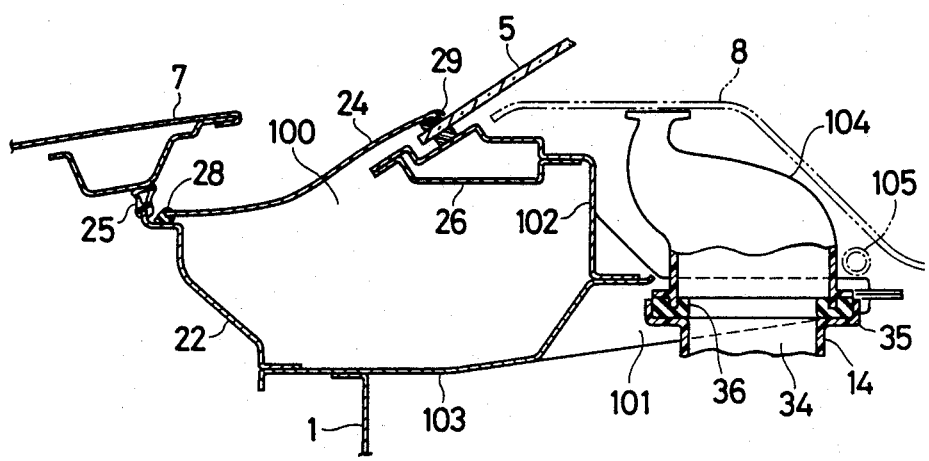
FIG. 12 is a cross section of the cowl box of embodiment 7.

This embodiment is shown in FIG. 11 and FIG. 12. A duct passage 101 in this embodiment is different from that in Embodiment 1.

In a cowl box 100, a duct passage 101 is formed by a recessed portion defined by a joint of the rear edges of the cowl rear panel 102 and the dash upper panel 103 and a defroster duct 104 extends, in a vertical direction, through the duct passage 101.

In this embodiment, the openings and the sealing of such openings as in the other embodiments are not necessary. Although the width, as taken in the lengthwise direction of the car body, of the cowl box 100 at the duct passage 101 is narrow, the width at the other sides of the duct passage 101 is broad so as to establish the amount of crushing (crushability) of the cowl box which could occur during a collision. Therefore, separation of the front windshield during a collision can be prevented.

A reduction in flexural rigidity and torsional rigidity due to formation of the duct passage 101 can be made up for with a reinforcement 105 having ends connected to the cowl rear panel 102.

As to the other details of this embodiment, such are similar to Embodiment 1.

Since the present invention can be embodied in many forms without departing from its essential characteristics, the foregoing embodiments are described solely for explanatory purposes and are not limitative. Every change within the true spirit and scope of the invention is seen to be included in the scope of the appended claims.

We claim:

1. Cowl box structure of a vehicle comprising a cowl box having an upper wall panel and a lower wall panel both extending transversely of the body of the vehicle within the instrument panel of the vehicle, said panels defining a duct passage, and an air duct of an air conditioner of the vehicle extending vertically through said duct passage, said cowl box and said air duct being superposed as taken transversely of the body of the vehicle.

2. Cowl box structure as claimed in claim 1, wherein said upper wall panel has an opening extending therethrough, and said lower wall panel has an opening extending therethrough, said openings defining said duct passage.

3. Cowl box structure as claimed in claim 2, wherein a circumferential edge part of said upper wall panel surrounding the respective opening therein is movably connected to a circumferential edge part of said lower wall panel surrounding the respective opening therein in a manner in which when a predetermined force acts on the cowl box in a rearward direction with respect to the vehicle, said circumferential edge parts are separated from each other.

4. Cowl box structure as claimed in claim 3, and further comprising an annular reinforcement projecting downwardly from the circumferential edge part of said upper wall panel, and an annular reinforcement projecting upwardly from the circumferential edge part of said lower wall panel, the reinforcements also defining said duct passage, and said upper and said lower wall panels being connected to one another through said reinforcements.

5. Cowl box structure as claimed in claim 2, wherein the opening extending through said upper wall panel is a slot being elongate transversely of the body of the vehicle.

6. Cowl box structure as claimed in claim 3, and further comprising sealing material interposed between said circumferential edge parts.

7. Cowl box structure as claimed in claim 2, and further comprising sealing material interposed between said duct passage and each of said circumferential edge parts.

8. Cowl box structure as claimed in claim 7, and further comprising a rubber boot disposed around and spaced from said air duct so as to form a layer of air therebetween, said boot extending between said openings, having an upper end portion connected to and establishing a seal between said air duct and the circumferential edge part of said upper wall panel, and having a lower end portion connected to and extending between said air duct and the circumferential edge part of said lower wall panel.

9. Cowl box structure as claimed in claim 1, wherein said upper and said lower wall panels have respective rear edge portions extending toward the front of the vehicle body so as to form a recessed portion of said cowl box defining said duct passage.

10. Cowl box structure as claimed in claim 9, and further comprising a reinforcement extending at the rear of said duct passage transversely of the vehicle body across said recessed portion of the cowl box, said reinforcement having opposite ends secured to said cowl box on opposite sides of said recessed portion of the cowl box.

11. Cowl box structure as claimed in claim 1, wherein a joint of said cowl box is formed between said upper and said lower wall panels, and said upper wall panel has a front end portion supporting the windshield of the vehicle, said upper wall panel having a bend therein so that the distance along said upper panel from said front end portion to said joint is greater than the straight line distance from said front end portion to said joint.

12. Cowl box structure as claimed in claim 11, wherein said upper wall panel comprises an upper shoulder part including said front end portion and a rear end, a vertical part extending downwardly from said upper shoulder part at said rear end thereof and having a lower end, and a lower shoulder part extending rearwardly in the vehicle from said vertical part at said lower end thereof and connected to said lower wall panel, respective bends in said upper wall panel defining the boundary between said upper shoulder part and said vertical part and between said vertical part and said lower shoulder part.

13. Cowl box structure as claimed in claim 1, wherein said upper wall panel has a front end portion supporting the windshield of the vehicle and has a rear end portion, said lower wall panel has a front end portion and has a rear end portion connected to the rear end portion of said upper panel, and said cowl box also has a front wall panel extending upwardly from the front end portion of said lower wall panel and has an upper end, the upper end of said front wall panel and the front end portion of said upper wall panel being separated from each other longitudinally of the vehicle body and not being directly mechanically connected to one another.

14. Cowl box structure as claimed in claim 13, wherein said upper wall panel has an opening extending therethrough, and said lower wall panel has an opening extending therethrough, said openings defining said duct passage.

15. Cowl box structure as claimed in claim 14, wherein a joint of said cowl box is formed between said upper and said lower wall panels, and said upper wall panel has a front end portion supporting the windshield of the vehicle, said upper wall panel having a bend therein so that the distance along said upper panel from said front end portion to said joint is greater than the straight line distance from said front end portion to said joint.

* * * * *